United States Patent [19]

Conard

[11] 4,360,740
[45] Nov. 23, 1982

[54] LOW VOLTAGE SWITCHING CIRCUIT FOR CONTROLLING A HIGH VOLTAGE ELECTRICAL LOAD

[76] Inventor: Albert F. Conard, 22495 Eloise Dr., El Toro, Calif. 92630

[21] Appl. No.: 298,318

[22] Filed: Sep. 1, 1981

[51] Int. Cl.³ ...................... H02P 13/16; H03K 17/72
[52] U.S. Cl. .................................. 307/134; 307/252 B
[58] Field of Search .................. 307/134, 113, 200 R, 307/252 B, 285, 415

[56] References Cited

U.S. PATENT DOCUMENTS

| | | | |
|---|---|---|---|
| 3,180,998 | 4/1965 | Onaru | 307/113 X |
| 3,243,611 | 3/1966 | Johansson | 307/134 |
| 3,493,783 | 2/1970 | Till | 307/252 B |
| 3,558,910 | 1/1971 | Dale et al. | 307/134 |
| 4,144,485 | 3/1979 | Akita | 307/134 |
| 4,155,015 | 5/1979 | Nakasone et al. | 307/252 B |

*Primary Examiner*—Donald A. Griffin
*Attorney, Agent, or Firm*—Mahoney & Schick

[57] ABSTRACT

Solid state high voltage electronic switching means, preferably a triac, is connected in series with a high voltage load, for instance, a light, across a high voltage alternating current power source. Contacts of a relay having a low voltage coil are operably connected for controlling the triac. A diode and solid state voltage limiting and storage means, preferably a zenier diode, are also connected in series across the high voltage alternating current power source converting alternating current to direct current and reducing and storing the now direct current providing a low voltage direct current power source. A capacitor may be connected in parallel with the zenier diode for aiding in storing and stabilizing the low voltage direct current. Alternately, low voltage switching means in the form of either a common on-off switch or a normally off-momentarily on manual switch operably connected to solid state low voltage electronic switching means are connected in series with the low voltage relay coil across the low voltage direct current power source for controlling the relay contacts thereby controlling the high voltage load with a low voltage circuit. The solid state low voltage electronic switching means forming part of one form of low voltage switching means may include a solid state flip-flop operably connected controlled by the normally off-momentarily on manual switch and operably connected to the base of a transistor with the transistor connected in series with the low voltage coil of the relay means across the low voltage direct current power source.

24 Claims, 2 Drawing Figures

LOW VOLTAGE SWITCHING CIRCUIT FOR CONTROLLING A HIGH VOLTAGE ELECTRICAL LOAD

BACKGROUND OF THE INVENTION

This invention relates to a low voltage switching circuit for controlling a high voltage electrical load and more particularly, to a low voltage switching circuit only requiring low voltage electric transmission lines between the high voltage electrical load and a controlling switch or various controlling switches at locations remote from the high voltage electrical load with all high voltage electric transmission lines being confined to supplying high voltage electrical power to the load per se. In one form of the switching circuit, the switch thereof may be a conventional on-off switch. In a more complex, but more advantageous form of the switching circuit, the switch or switches thereof may be a normally off-momentarily on switch or switches connected with certain other components permitting more convenient push-button control. In all forms of the invention, solid state components are extensively used in a unique manner providing maximum compactness, minimum installation expense and maximum overall efficiency.

In substantially all present day residential structures, the same being true of most light commercial structures, the entire electrical wiring thereof is for high voltage electric transmission, for instance, the usual 110 volt alternating current. Virtually no low voltage current, whether alternating current or direct current, is used. One exception to this involves doorbell or door chime circuitry, but obviously, this is of an extremely minor nature.

According to U.S. building standards, 60 volts is the segregation point between high and low voltage, any electrical power 50 volts or above is considered high voltage and anything below 50 volts is considered low voltage. Furthermore, where high voltage electrical power is concerned, the transmission lines must be relatively heavily shielded and insulated due to the greater dangers of arcing and leakage which can result in the consequence of fire and other damage. With low voltage electrical power, the transmission lines therefor, only need be relatively lightly insulated since the foregoing dangers are not present. Thus, in the case of high voltage electric power transmission, the transmission lines are relatively large and bulky, while the low voltage electric transmission lines are relatively small and flexible.

Where only high voltage electrical power is used, this means that the total electrical wiring of the structure must be of the relatively bulky high voltage type, that is, to the particular electrical load for supplying high voltage power thereto and from that electrical load to the switch or switches controlling the same. As an example, consider a ceiling light to be controlled by a wall switch at three or four foot level. The high voltage transmission lines must be directed to the ceiling light for supplying the power thereto and to the wall switch for control of the power, and due to the size, lack of flexibility and bulkiness of the high voltage transmission lines, they can only be positioned recessed within the structure ceiling and recessed within the structure walls. There is little other choice since the size of the high voltage transmission lines would create an unsightly situation unless in this internal ceiling and wall position.

Considering the same example, if the high voltage transmission lines were confined to merely supplying the high voltage power to the load, in this case the ceiling light, and the transmission lines from the ceiling light to the wall mounted switch could somehow be changed to low voltage transmission lines, it is obvious that various advantages could be readily gained. One advantage could be that of cost savings and another that of greater choice of positioning. Only a fraction of the transmission lines would have to be of the heavily shielded and insulated, relatively bulky type which is quite expensive as compared to what could be used for the remaining transmission lines of the relatively lightly insulated and flexible, low voltage type. Furthermore, whereas the high voltage transmission lines in the ceiling would still require recessing totally within the ceiling structure, the low voltage transmission lines could either be recessed within the structure ceiling and walls or positioned directly beneath many types of ceiling, wall and floor coverings to permit maximum versatility while still being totally satisfactory from both safety and aesthetic considerations.

OBJECTS AND SUMMARY OF THE INVENTION

It is, therefore, an object of this invention to provide a low voltage switching circuit for controlling a high voltage electrical load which, for example, when applied to the electrical circuitry of a structure, permits all high voltage transmission lines of the structure to be confined to supplying electrical power directly to the various electrical loads and the electrical power transmission lines between such electrical loads and the switches for controlling the same may be low voltage transmission lines. In one form of the invention, the high voltage electrical power to the electrical load is controlled by a low voltage relay, low voltage circuitry and an on-off switch. In a more complex form of the invention, the high voltage electrical power to the electrical load is controlled through a low voltage relay, low voltage circuitry incorporating various electrical components and one or more normally off-momentarily on switches. Thus, either of the preferred forms of the invention provide the distinct advantages hereinbefore discussed.

It is a further object of this invention to provide a low voltage switching circuit for controlling a high voltage electrical load of the foregoing advantageous character wherein various solid state components are incorporated therein to maximize the effeciency thereof and, equally important, to also greatly increase the compactness thereof. For instance, it is preferred to control the high voltage electrical power to the electrical load by use of solid state switching means which is, in turn, controlled by the low voltage relay. Furthermore, low voltage electrical power for the low voltage switching circuit is preferably created by converting the high voltage electrical power through diode means and a solid state voltage limiting means. Still further, where the form of the invention is the more complex form thereof including the normally off-momentarily on switch, the switching circuit includes solid state low voltage electronic switching means. Overall, therefore, it can be seen that the preferred form of assemblies incorporating the principals of the present invention make full use of modern miniaturized components and circuitry requiring minimum mounting space while still deriving all of the advantages of the unique construction.

It is still a further object of this invention to provide a low voltage switching circuit for controlling a high voltage electrical load wherein distinct advantages may be gained both in economy and versatility. Use in structure wiring of a high percentage of low cost, low voltage transmission lines, as compared to the far greater cost of the high voltage transmission lines, greatly reduces the cost of the overall structure wiring. At the same time, as hereinbefore discussed, with the relatively bulky, high voltage transmission lines confined to only supplying high voltage power directly to the electrical load or loads and the relatively inconspicuous and flexible, low voltage transmission lines serving as virtually all of the remainder of the structure wiring, extreme versatility in the positioning of the major portion of the structure wiring is offered. Although the high voltage transmission lines are still confined to internal structure walls and ceilings as before, the far greater extent of low voltage transmission lines may be positioned at virtually any location having some form of exterior covering such as exterior of any of the ceilings, walls and floors beneath any of the various modern coverings therefor.

Other objects and advantages of the invention will be apparent from the following specification and the accompanying drawing which are for the purpose of illustration only.

DESCRIPTION OF THE BEST EMBODIMENTS CONTEMPLATED

Figure 1:
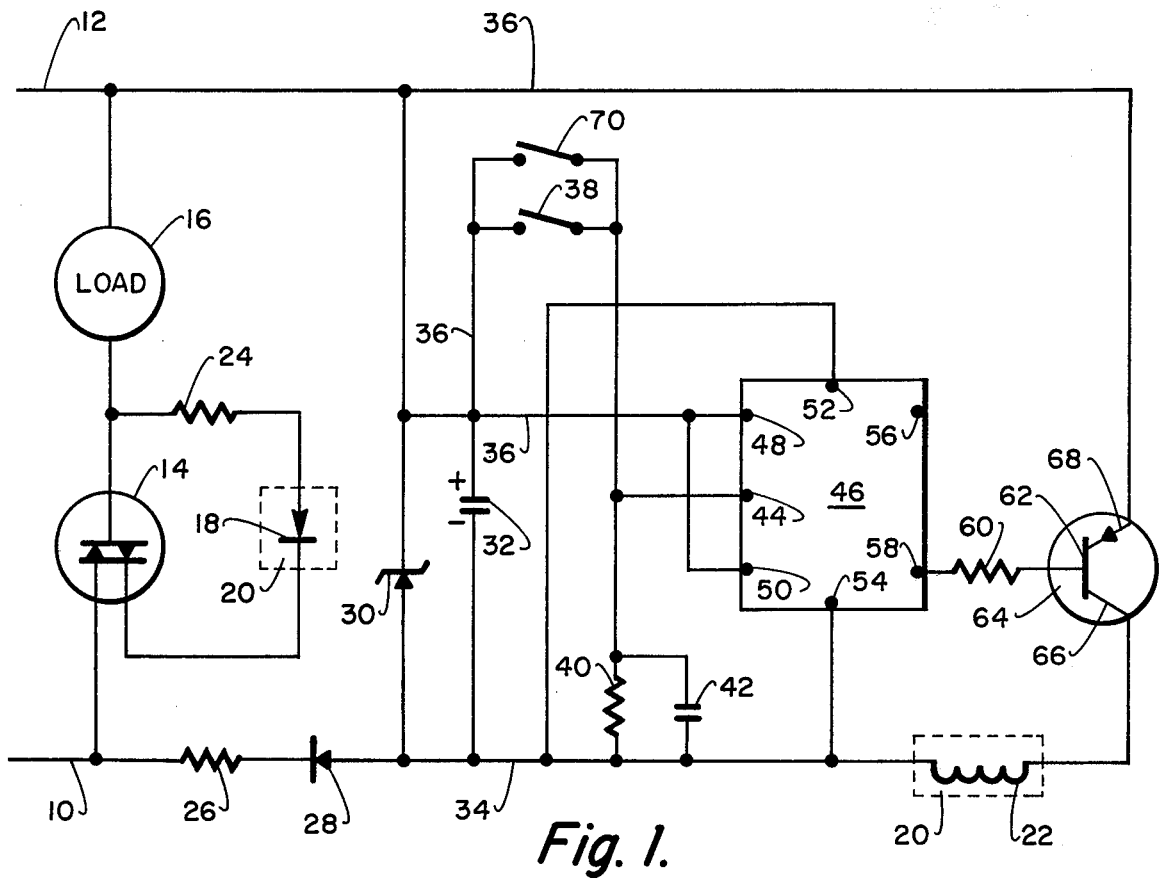
FIG. 1 is a wiring diagram of a preferred embodiment of the low voltage switching circuit for controlling a high voltage electrical load of the present invention.

Referring to FIG. 1 of the drawing, a wiring diagram of a first preferred embodiment of the low voltage switching circuit for controlling a high voltage electrical load is shown and includes a high voltage alternating current power source being denoted by high voltage alternating current transmission lines 10 and 12 with a solid state high voltage electronic switching means 14 and a high voltage electrical load 16 connected in series thereacross, therefore, across the high voltage power source. As hereinbefore pointed out, according to U.S. building standards, high voltage is 50 volts or above and low voltage below 50 volts. Thus, here, the high voltage power source may be 110 volts alternating current. Furthermore, the solid state high voltage electronic switching means 14 is preferably a triac and the high voltage electrical load may be any such load making use of 110 volt alternating current for actuation thereof, for instance, a light.

The solid state high voltage electronic switching means 14 is controlled for being energized or de-energized to transmit or interrupt high voltage electrical power therethrough by contacts 18 of a low voltage relay 20 having a usual low voltage relay coil 22. The relay contacts 18 are operably connected to the input of the solid state high voltage electronic switching means 14 and through a resistor 24 to the output thereof. Thus, when relay contacts 18 are closed, the solid state high voltage electronic switching means 14 is energized transmitting high voltage electrical power to the load 16 and when the relay contacts 18 are opened, the solid state high voltage electronic switching means 14 is de-energized interrupting high voltage electrical power to the load. The resistor 24 limits the current through the relay contacts 18.

The high voltage alternating current transmission line 10 is also connected in series through a resistor 26, a diode 28 and a solid state voltage limiting means 30 to the high voltage alternating current transmission line 12. A capacitor 32 is preferably connected in parallel with the solid state voltage limiting means 30. Thus, resistor 26 limits the current to the diode 28 which changes the alternating current electrical power to direct current electrical power and the solid state voltage limiting means 30 reduces the voltage from high to low voltage, say 12 volts direct current, with the capacitor 32 aiding in storing and stabilizing the low voltage direct current. Therefore, at this stage, a low voltage direct current power source is created as denoted by low voltage direct current transmission lines 34 and 36, the direct current transmission line 34 being negative and the direct current transmission line 36 being positive.

In this first embodiment form of the low voltage switching circuit, as shown in FIG. 1, the low voltage relay coil 22 of the low voltage relay 20 is controlled for being energized and de-energized by a relatively sophisticated low voltage switching means. Broadly, it is preferred to make use of at least one normally off-momentarily on manual switch, preferably a push-button switch, which is operably connected to solid state low voltage electronic switching means. The electronic switching means is constructed and arranged convertible between transmitting and non-transmitting modes by the manual switch being selectively moved temporarily to momentarily on and remaining in that particular of these modes upon the manual switch then being moved back to normally off. The electronic switching means in its transmitting mode energizes the low voltage relay coil and de-energizes the same when in its non-transmitting mode.

Specifically to the wiring circuit of FIG. 1, one side of a normally off-momentarily on manual switch 38 is connected to the positive low voltage direct current transmission line 36 and the other side of the switch 38 is connected both to the negative low voltage direct current transmission line 34 through parallel connected current limiting resistor 40 and voltage storing and stabilizing capacitor 42, and to input terminal 44 of a well known solid state flip-flop 46. Both input terminals 48 and 50 of the flip-flop 46 are connected to the positive low voltage direct current transmission line 36 and both input terminals 52 and 54 of the flip-flop 46 are connected to the negative low voltage direct current transmission line 34. Finally, output terminal 56 of the flip-flop 46 is unconnected and output terminal 58 of the flip-flop 46 is connected through a current limiting resistor 60 to a controlling base 62 of a low voltage transmission controlling transistor 64. Completing the overall circuitry, the low voltage relay coil 22 of the low voltage relay 20 is connected to the negative low voltage direct current transmission line 34 and to input 66 of the transistor 64, while output 68 of the transistor is connected to the positive low voltage direct current transmission line 36.

In operation of the flip-flop 46 by the normally off-momentarily on switch 38, as is usual, the output terminals 56 and 58 have opposite polarities. When output terminal 56 is positive, output terminal 58 is negative and when output terminal 56 is negative, output terminal 58 is positive. These polarities are selectively reversed by applying a momentary positive voltage to input terminal 44.

As an example, assume the output terminal 56 of the flip-flop 46 is positive and the output terminal 58 is negative. Momentarily closing the normally off-momentarily on switch 38 places a positive voltage on the input terminal 44 of the flip-flop 46 causing the polarities of output terminals 56 and 58 to reverse, that is, output terminal 56 now being negative and output terminal 58 now being positive. Such polarities will then remain upon the switch 38 being permitted to then return to off. Again reversing the polarities of the output terminals 56 and 58 merely requires a repeat of the exact same procedure.

Now, when a positive voltage is applied to the base 62 of the transistor 64, the transistor will not transmit. When, however, a negative voltage is applied to the base 62 of the transistor 64, the transistor will transmit direct current therethrough from the input 66 to the output 68. In effect, therefore, when the transistor 64 is non-transmitting, the low voltage relay coil 22 of the low voltage relay 20 is de-energized and when the transistor is transmitting, the low voltage relay coil is energized.

In overall operation of this first embodiment of the low voltage switching circuit in controlling the high voltage electrical load as shown in FIG. 1, assume that the high voltage electrical load 16 is a 110 volt light or similar 110 volt appliance and that the load 16 is non-energized so that the high voltage electrical power therethrough is interrupted. In this condition, output terminal 48 of the low voltage flip-flop 46 is positive applying a positive voltage to the base 62 of the low voltage transistor 64 so that no low voltage direct current electrical power is being transmitted by the transistor and the low voltage relay coil 22 of the low voltage relay 20 is de-energized. Since the low voltage relay coil 22 of the low voltage relay 20 is de-energized, the contacts 18 of the relay are open and no high voltage electrical power is directed to the solid state high voltage electronic switching means 14 to cause it to transmit high voltage electrical power therethrough.

To energize the high voltage electrical load 16, the normally off-momentarily on switch 38 which has been undisturbed so as to be normally off is manually moved to momentarily on placing a positive voltage on input terminal 44 of the flip-flop 46. This reverses the polarities of the flip-flop output terminals 56 and 58 placing a negative voltage on output terminal 58 which applies this negative voltage to the base 62 of the transistor 64. Manual release of the normally off, momentarily on switch 38 permits this polarity change to remain. More important, a negative voltage on the transistor base 62 causes the transistor 64 to transmit directing low voltage direct current electrical power through the low voltage relay coil 22 of the low voltage relay 20 closing the relay contacts 18. Closure of the relay contacts 18 directs high voltage alternating current electrical power to the solid state high voltage electronic switching means 14 causing it to transmit high voltage alternating current electrical power therethrough and through the high voltage electrical load 16, thereby energizing the load.

Returning the high voltage electrical load 16 to a de-energized or off state merely requires a repeat of the exact same procedure. Momentary manual actuation of the normally off-momentarily on switch 38 to momentarily on reverses the polarity of the flip-flop output terminals 56 and 58 converting the transistor 64 to non-transmitting, de-energizing the relay coil 22 and opening the contacts 18 of the relay 20, and converting the electronic switching means 14 to non-transmitting so that the load 16 is once again de-energized. Furthermore, any number of normally off-momentarily on switches may be connected in parallel with the normally off-momentarily on switch 38, such as a second normally off-momentarily on switch 70, and each will operate the circuitry in identical manner with any one being operable to convert the circuitry to on and that same one or any other then used to convert the circuitry to off.

As an example of specific electrical and electronic components for constructing the circuitry of this first embodiment of the present invention, and designating the same in nomenclature well known and readily identifiable by those skilled in the art, the solid state high voltage electronic switching means 14 may be a 15 A. triac-56004 Sylvania or equivalent and the high voltage electrical load 16 may be a 110 V. light or similar appliance. The low voltage relay 20 may be usual, the resistor 24 a 2200 ohm 0.5 watt resistor, the resistor 26 a 6000 ohm 3 watt resistor and the diode 28 a 1N4001 diode. The solid state voltage limiting means 30 may be a ZD2 12 V. 500 milliwatt zenier, the capacitor 32 a 22MFD. 25 V. capacitor and the normally off-momentarily on switches 38 and 70 conventional push-button switches. The resistor 40 may be a 10,000 ohm 0.25 watt resistor, the capacitor 42 a 0.1MFD. 50 V. capacitor and the flip-flop 46 a ½ 4027CMOS. Finally, the resistor 60 may be a 10,000 ohm 0.25 watt resistor and the transistor 64 a PNP IN4402 transistor.

Figure 2:
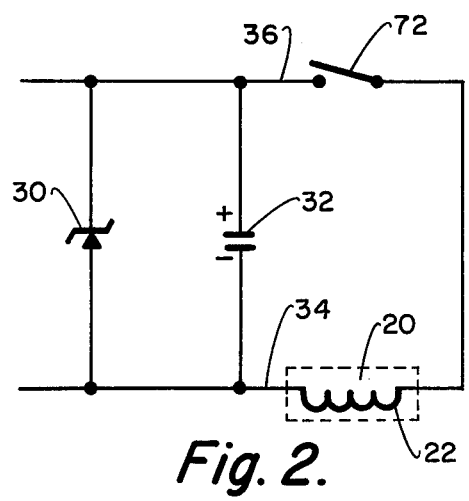
FIG. 2 is a partial wiring diagram of a more simplified preferred embodiment thereof.

A second embodiment of the low voltage switching circuit for controlling a high voltage electrical load is partially shown in FIG. 2 and is of a much more simplified form. The circuitry is identical in the high voltage alternating current portion and to the completion of the low voltage direct current power source creating the low voltage direct current transmission lines 34 and 36. At this stage, the entire of the normally off-momentarily on switches 38 and 70, the resistor 40, the capacitor 42, the flip-flop 46, the resistor 60 and the transistor 64 are replaced by a simple on-off switch 72 such as a common toggle switch. As shown in FIG. 2, the low voltage relay coil 22 of the low voltage relay 20 is connected in series with the low voltage direct current transmission line 34 and through the on-off switch 72 to the low voltage direct current transmission line 36.

Thus, with this second embodiment circuitry, when the on-off switch 72 is open so that no low voltage direct current power is transmitted through the relay coil 22, the relay contacts 18 are open, the solid state high voltage electronic switching means 14 is not transmitting high voltage alternating current electrical power to the load 16 so that the load is not energized. Closing of the on-off switch 72 directs low voltage direct current power through the relay coil 22 closing the relay contacts 18 to energize the solid state high voltage electronic switching means 14 and cause it to transmit high voltage alternating current power therethrough to the load 16 for energizing the load.

Thus, with use of either embodiment of the present invention, it is apparent that definite advantages in versatility and overall cost can be obtained. With either embodiment form, high voltage transmission lines are only required for providing the high voltage alternating current to the solid state high voltage electronic switching means 14, the high voltage electrical load 16 and the elements required for converting the high voltage alternating current to low voltage direct current. The entire switching circuit, whether the more complex form of the first embodiment or the simplified form of the second embodiment, may be totally with low voltage transmission lines. This means that although a portion of the circuitry must be of the heavily shielded and insulated, relatively stiff and bulky high voltage form which must be recess positioned, a large portion of the transmission lines may be of the lightly insulated and highly flexible low voltage form which may be positioned at a multiplicity of locations, for instance, recessed or merely directly beneath any of a wide variety of ceiling, wall and floor coverings.

Considering a simple specific use of the principals of the present invention in residential structure electrical wiring, assume that a given room is to have a ceiling light with one or more wall switches at three or four foot level for controlling the ceiling light. The high voltage alternating current transmission lines would require recessing within the ceiling for extension to the light fixture for the light and making use of solid state components, all of the additional electrical components with the exception of the particular switch or switches can be mounted within the light fixture. The switch or switches would be mounted in the wall or walls and all electrical transmission lines between the ceiling light fixture and the wall switch or switches would be of the lightly insulated and heavily flexible low voltage form so as to be positionable at the variety of locations as hereinbefore pointed out.

Considering the original electrical wiring of an entire structure or the re-wiring of an entire older structure or even merely the electrical wiring of improvements and additions to an existing structure, the cost savings can be appreciable, as well as the advantages from versatility and the additional cost savings created thereby. In both new and existing structures, the cost of providing the additional electrical components for making use of both high voltage alternating current and low voltage direct current would be far outweighed by the cost savings in only being required to use the expensive high voltage transmission lines directly to the various loads being supplied and being able to make use of the low cost low voltage transmission lines for the remainder of the wiring. Furthermore, the versatility of positioning of the low voltage transmission lines would be an additional cost saving factor, and this would become even more important in re-wiring or improvement wiring in an already existing structure.

Still another important example of use of the principals of the present invention which more critically involves the safety factor would be use of the principals of the present invention for wiring of the various equipment required around swimming pools, spas and the like. The only high voltage transmission lines required would be directly to the equipment involved and all switching circuits therefore would be with low voltage transmission lines. In view of the fact that the low voltage of the low voltage transmission lines would create virtually no danger from injury, the low voltage transmission lines can be brought directly to switches immediately at the pool or spa, again adding to all of safety, versatility and convenience.

Although the principals of the present invention have been illustrated herein in various embodiment forms making use of particular electrical components, it is pointed out that it is not intended to limit the principals of the present invention to the specific illustrations shown. Obviously, various other electrical components could be substituted for carrying out the same or similar functions. Thus, the principals of the present invention should be broadly construed and not limited beyond the specific limitations set forth in the appended claims including the patent equivalents thereof.

I claim:

1. In an electrical circuit for controlling a high voltage electrical load by a low voltage switching circuit; the combination of: a high voltage alternating current power source; solid state high voltage electronic switching means and a high voltage load to be energized connected in series across said alternating current power source, said electronic switching means transmitting high voltage electrical power therethrough to energize said high voltage load when energized and interrupting said high voltage electrical power therethrough to de-energize said high voltage load when de-energized; relay means having contacts operably connected to said electronic switching means energizing said switching means when closed and de-energizing said switching means when open, a low voltage coil causing closing of said contacts when energized and opening of said contacts when de-energized; diode means for converting said alternating current power source to direct current power source and solid state voltage limiting and storage means for reducing and storing the now direct current power, said diode means and said voltage limiting and storage means being connected in series across said alternating current power source; low voltage switching means and said low voltage coil of said relay means connected in series across said low voltage direct current power source of said voltage limiting and storage means for selectively energizing and de-energizing said low voltage coil of said relay means to selectively energize and de-energize said high voltage load.

2. In an electric circuit as defined in claim 1 in which said high voltage electronic switching means includes a triac connected in series with said high voltage load across said alternating current power source; and in which said contacts of said relay means are operably connected to said triac and said alternating current power source.

3. In an electric circuit as defined in claim 1 in which said voltage limiting and storage means includes capacitor means connected across said direct current power source for aiding in storing and stabalizing said low voltage direct current.

4. In an electric circuit as defined in claim 1 in which said voltage limiting and storage means includes a zener diode connected in series with said diode means across said alternating current power source.

5. In an electric circuit as defined in claim 1 in which said low voltage switching means includes an on-off switch selectively positionable in each of an on position energizing and an off position de-energizing said relay means low voltage coil.

6. In an electric circuit as defined in claim 1 in which said low voltage switching means includes a normally off-momentarily on manual switch operably connected to solid state low voltage electronic switching means, said electronic switching means being convertible between transmitting and non-transmitting modes by said manual switch being selectively moved temporarily to momentarily on and remaining in that particular of said modes upon said manual switch then being moved back to normally off, said electronic switching means energizing said low voltage coil when in said transmitting mode and de-energizing said low voltage coil when in said non-transmitting mode.

7. In an electric circuit as defined in claim 6 in which said low voltage electronic switching means includes a solid state flip-flop operably connected to said manual switch and operably connected to the base of a transistor, said transistor being operably connected in series with said low voltage coil of said relay means across said low voltage direct current power source.

8. In an electric circuit as defined in claim 6 in which said normally off-momentarily on manual switch is connected in parallel with a second normally off-momentarily on manual switch each independently operable in similar manner.

9. In an electric circuit as defined in claim 6 in which said low voltage electronic switching means includes a solid state flip-flop operably connected to said manual switch and operably connected to the base of a transistor, and transistor being operably connected in series with said low voltage coil of said relay means across said low voltage direct current power source; and in which said normally off-momentarily on manual switch is connected in parallel with a second normally off-momentarily on manual switch each independently operable in similar manner.

10. In an electric circuit as defined in claim 1 in which said high voltage electronic switching means includes a triac connected in series with said high voltage load across said alternating current power source; in which said contacts of said relay means are operably connected to said triac and said alternating current power source; and in with said low voltage switching means includes a normally off-momentarily on manual switch operably connected to solid state low voltage electronic switching means, said electronic switching means being convertible between transmitting and non-transmitting modes by said manual switch being selectively moved temporarily to momentarily on and remaining in that particular of said modes upon said manual switch then being moved back to normally off, said electric switching means energizing said low voltage coil when in said transmitting mode and de-energizing said low voltage coil when in said non-transmitting mode.

11. In an electric circuit as defined in claim 1 in which said voltage limiting and storage means includes a zenier diode connected in series with said diode means across said alternating current power source; and in which said low voltage switching means includes a normally off-momentarily on manual switch operably connected to solid state low voltage electronic switching means, said electronic switching means being convertible between transmitting and non-transmitting modes by said manual switch being selectively moved temporarily to momentarily on and remaining in that particular of said modes upon said manual switch then being moved back to normally off, said electronic switching means energizing said low voltage coil when in said transmitting mode and de-energizing said low voltage coil when in said non-transmitting mode.

12. In an electric circuit as defined in claim 1 in which said high voltage electronic switching means includes a triac connected in series with said high voltage load across said alternating current power source; in which said contacts of said relay means are operably connected to said triac and said alternating current power source; in which said voltage limiting and storage means includes a zenier diode connected in series with said diode means across said alternating current power source; and in which said low voltage switching means includes a normally off-momentarily on manual switch operably connected to solid state low voltage electronic switching means, said electronic switching means being convertible between transmitting and non-transmitting modes by said manual switch being selectively moved temporarily to momentarily on and remaining in that particular of said modes upon said manual switch then being moved back to normally off, said electronic switching means energizing said low voltage coil when in said transmitting mode and deenergizing said low voltage coil when in said non-transmitting mode.

13. In a method of controlling a high voltage electrical load by a low voltage switching circuit; the steps of: converting a high voltage alternating current power source to a low voltage direct current power source by use of diode means and solid state voltage limiting means; directing said low voltage direct current power source through series connected selectively operable switching means and a low voltage relay coil for energizing said relay coil by low voltage direct current when said switching means is in a closed position and de-energizing said relay coil when said switching means is in an open position; directing said high voltage alternating current power source through series connected solid state high voltage switching means and a high voltage electrical load, said switching means transmitting high voltage electrical power therethrough to energize said high voltage load when energized and interrupting said high voltage electrical power therethrough to de-energize said high voltage load when de-energized; operably connecting relay contacts controlled by said low voltage relay coil to said high voltage switching means for energizing said switching means when closed and de-energizing said switching means when open, said relay contacts being closed by said relay coil when said relay coil is energized and being opened when said relay coil is de-energized.

14. In a method as defined in claim 13 in which said step of directing said high voltage alternating current power source through said solid state high voltage switching means includes directing said high voltage alternating current power source through a triac; and in which said step of operably connecting said relay contacts to said high voltage switching means includes operably connecting said relay contacts to said triac and to said high voltage alternating current power source.

15. In a method as defined in claim 13 in which said step of converting said high voltage alternating current power source to said low voltage direct current power source includes stabilizing low voltage direct current of said low voltage direct current power source.

16. In a method as defined in claim 13 in which said step of converting a high voltage alternating current power source to a low voltage direct current power source by use of solid state voltage limiting means includes using a zenier diode as said solid state voltage limiting means.

17. In a method as defined in claim 13 in which said step of directing said low voltage direct current power source through series connected selectively operable switching means includes directing said low voltage direct current power source through an on-off switch selectively positionable in each of an on position energizing and an off position de-energizing said relay coil.

18. In a method as defined in claim 13 in which said step of directing said low voltage direct current power source through said selectively operable switching means includes using switching means in the form of a normally off-momentarily on manual switch operably connected to solid state low voltage electronic switching means with said electronic switching means being convertible between transmitting and non-transmitting modes by said manual switch being selectively moved temporarily to momentarily on and remaining in that particular of said modes upon said manual switch then being moved back to normally off so that said electronic switching means energizes said low voltage coil when in said transmitting mode and de-energizes said low voltage coil when in said non-transmitting mode.

19. In a method as defined in claim 18 in which said use of said solid state low voltage electronic switching means includes use of a solid state flip-flop operably connected to said manual switch and operably connected to the base of a transistor with said transistor being operably connected in series with said low voltage relay coil.

20. In a method as defined in claim 18 in which said using of said switching means in the form of said normally off-momentarily on manual switch includes selectively alternately using said manual switch and a second similar manual switch connected in parallel therewith.

21. In a method as defined in claim 18 in which said use of said solid state low voltage electronic switching means includes use of a solid state flip-flop operably connected to said manual switch and operably connected to the base of a transistor with said transistor being operably connected in series with said low voltage relay coil; in which said using of said switching means in the form of said normally off-momentarily on manual switch includes selectively alternately using said manual switch and a second similar manual switch connected in parallel therewith.

22. In a method as defined in claim 13 in which said step of directing said high voltage alternating current power source through said solid state high voltage switching means includes directing said high voltage alternating current power source through a triac; in which said step of operably connecting said relay contacts to said high voltage switching means includes operably connecting said relay contacts to said triac and to said high voltage alternating current power source; and in which said step of directing said low voltage direct current power source through said selectively operable switching means includes using switching means in the form of a normally off-momentarily on manual switch operably connected to solid state low voltage electronic switching means with said electronic switching means being convertible between transmitting and non-transmitting modes by said manual switch being selectively moved temporarily to momentarily on and remaining in that particular of said modes upon said manual switch then being moved back to normally off so that said electronic switching means energizes said low voltage coil when in said transmitting mode and de-energizes said low voltage coil when in said non-transmitting mode.

23. In a method as defined in claim 13 in which said step of converting a high voltage alternating current power source to a low voltage direct current power source by use of solid state voltage limiting means includes using a zenier diode as said solid state voltage limiting means; and in which said step of directing said low voltage direct current power source through said selectively operable switching means includes using switching means in the form of a normally off-momentarily on manual switch operably connected to solid state low voltage electronic switching means with said electronic switching means being convertible between transmitting and non-transmitting modes by said manual switch being selectively moved temporarily to momentarily on and remaining in that particular of said modes upon said manual switch then being moved back to normally off so that said electronic switching means energizes said low voltage coil when in said transmitting mode and de-energizes said low voltage coil when in said non-transmitting mode.

24. In a method as defined in claim 13 in which said step of directing said high voltage alternating current power source through said solid state high voltage switching means includes directing said high voltage alternating current power source through a triac; in which said step of operably connecting said relay contacts to said high voltage switching means includes operably connecting said relay contacts to said triac and to said high voltage alternating current power source; in which said step of converting a high voltage alternating current power source to a low voltage direct current power source by use of a solid state voltage limiting means includes using a zenier diode as said solid state voltage limiting means; and in which said step of directing said low voltage direct current power source through said selectively operable switching means includes using switching means in the form of a normally off-momentarily on manual switch operably connected to solid state low voltage electronic switching means with said electronic switching means being convertible between transmitting and non-transmitting modes by said manual switch being selectively moved temporarily to momentarily on and remaining in that particular of said modes upon said manual switch then being moved back to normally off so that said electronic switching means energizes said low voltage coil when in said transmitting mode and de-energizes said low voltage coil when in said non-transmitting mode.

* * * * *